United States Patent [19]
Leigeber et al.

[11] Patent Number: 6,071,438
[45] Date of Patent: Jun. 6, 2000

[54] PROCESS FOR THE PRODUCTION OF THREE-DIMENSIONALLY CROSSLINKED POLYMERIC MATERIALS HAVING BROAD CHOLESTERIC REFLECTION BANDS, AND FILTERS, REFLECTORS AND POLARIZERS PRODUCED BY THIS PROCESS

[75] Inventors: Horst Leigeber, Oberhaching; Eckhard Hanelt, Geltendorf; Franz-Heinrich Kreuzer, Martinsried, all of Germany

[73] Assignee: Consortium fur elektrochemische Industrie GmbH, Munich, Germany

[21] Appl. No.: 09/067,634

[22] Filed: Apr. 28, 1998

[30] Foreign Application Priority Data

Apr. 30, 1997 [DE] Germany .............. 197 18 293

[51] Int. Cl.⁷ .............. F21V 9/14; C09K 19/52
[52] U.S. Cl. .............. 252/585; 252/299.01; 428/1
[58] Field of Search .............. 252/299.01, 582, 252/585; 428/1

[56] References Cited

U.S. PATENT DOCUMENTS

| | | |
|---|---|---|
| 4,388,453 | 6/1983 | Finkelmann et al. .............. 252/299.01 |
| 4,637,896 | 1/1987 | Shannon . |
| 5,211,877 | 5/1993 | Andrejewski et al. .............. 252/299.01 |
| 5,362,315 | 11/1994 | Muller-Rees et al. .............. 252/299.5 |
| 5,683,622 | 11/1997 | Kratzschmar et al. .............. 252/299.01 |

FOREIGN PATENT DOCUMENTS

| | | |
|---|---|---|
| 0066137 | 7/1985 | European Pat. Off. . |
| 0220828 | 9/1985 | European Pat. Off. . |
| 0358208 | 3/1994 | European Pat. Off. . |
| 0606940 | 2/1995 | European Pat. Off. . |
| 2180243 | 3/1987 | United Kingdom . |

OTHER PUBLICATIONS

Database WPI, Class A89, AN94–257675, JP 06 186 534 A (Nippon Oil Co Ltd), (1994).
Database WPI, Class A89, AN86–085U77, (1986) JP 61 032 801 A (Matsushita Elec Ind Co Ltd).

*Primary Examiner*—Philip Tucker
*Attorney, Agent, or Firm*—Brook & Kushman P C

[57] ABSTRACT

The invention relates to a process for the preparation of three-dimensionally crosslinked polymeric materials having a broad cholesteric reflection band, which comprises bringing polymeric materials having cholesteric properties and an extractable material content into contact with a solvent or solvent mixture.

9 Claims, 2 Drawing Sheets

PROCESS FOR THE PRODUCTION OF THREE-DIMENSIONALLY CROSSLINKED POLYMERIC MATERIALS HAVING BROAD CHOLESTERIC REFLECTION BANDS, AND FILTERS, REFLECTORS AND POLARIZERS PRODUCED BY THIS PROCESS

TECHNICAL FIELD

The invention relates to a process for the production of three-dimensionally crosslinked polymeric materials having broad cholesteric reflection bands, and filters, reflectors and polarizers produced by this process.

BACKGROUND OF THE INVENTION

Oriented cholesteric layers usually exhibit a molecular arrangement in which the axis of the helix formed by the mesogenic groups is aligned perpendicular to the two outer surfaces of the film. The pitch of the helix is constant over the layer thickness. Such films are optically active and are distinguished by the fact that unpolarized incident light in the region of the reflection wavelength is split into two circular-polarized part-beams, one of which is reflected and the other of which is transmitted. The two light components differ through their direction of rotation, which is determined by the chiral species present in the optically active layer. The type and proportion of the chiral species of such cholesteric liquid crystals determine the pitch of the twisted structure and thus the wavelength of the reflected light. The twist of the structure can be either left-handed or right-handed. The reflection color is connected to the pitch of the twisted structure referred to as p, and the mean molecular refractive index n. The following relationship applies for the central wavelength of the reflected light:

$$\lambda = n \times p$$

The reflected light has a band width given by the difference between the two refractive indices:

$$\Delta\lambda = p \times (n_e - n_o)$$

$n_o$ and $n_e$ denote the refractive indices of the ordinary and extraordinary beams, while the following relationship applies to the mean refractive index n:

$$n = \frac{1}{2}(n_o + n_e)$$

Polymers having a cholesteric phase usually have a refractive index difference $\Delta n$ of from 0.1 to 0.2, giving a reflected light band width of <100 nm for light in the visible spectral region. The band widths are frequently only 30–50 nm, in particular for light in the blue region of the optical spectrum.

A combination of these cholesteric films with a quarter-wave retardation element enables the generation of linear-polarized light. Such combinations using cholesteric polymers are described, for example, in R. Maurer et al. under the title "Polarizing Color Filters made from Cholesteric LC Silicones", SID 90 Digest, 1990, pp. 110–113.

Cholesteric layers used in the field of filters and reflectors require adjustment of the optical properties over a broad spectral region, where it should be possible to adjust the mean wavelength of the reflection band and the width of the band as flexibly as possible. It has hitherto only been possible to adjust the band width in a narrow range due to the limited potential for changing the refractive index by molecular optimization. A polymer having this limited band width is usually established before crosslinking by a combination of suitable monomers and a suitable chiral species and fixed by crosslinking. After crosslinking, correction is usually not possible.

In many instances, however, there is a need for optically active layers whose band width covers the entire visible spectral region of light. For this, band widths of at least 250 nm are required. This is achievable by a combination of a number of layers of cholesteric polymers with different pitch. One proposal in this respect is given in R. Maurer, as cited above. The production of such multiple layers, however, is complex and expensive.

Theoretical considerations by R. Dreher, Solid State Communications, Vol. 12, pp. 519–522, 1973, S. Mazkedian, S. Melone, F. Rustichelli, J. Physique Colloq. 36, C1–283 (1974), and L. E. Hajdo, A. C. Eringen, J. Opt. Soc. Am. 36, 1017 (1976), show that a helical layer structure whose pitch changes in a linear manner over the layer thickness of the film should have the ability to reflect light in a broad band range. R. S. Pindak, C. C. Huang, J. T. Ho, Phys. Rev. Lett. 32, 43 (1974), describe the generation of a pitch gradient in cholesteryl nonanoates by means of a temperature gradient. It is a disadvantage of the process described that, due to the generally good thermal conductivity of polymers in thin films, high temperature gradients can only be produced with difficulty. The pitch gradient produced is, thus, only visible at the particular temperature.

EP 0 606 940 A2 (Broer et al) describes the generation of a helix with continuously varied pitch by diffusion of different monomers (chiral and achiral) during simultaneous and slow crosslinking. The use of an additional dye to generate an axial gradient in the light intensity is necessary for relatively large band widths. In addition to the long exposure time to UV light, the additional dye restricts the spectral band width in the region of short wavelengths. A further disadvantage of this process is that, due to the restriction to certain monomers and chiral species, little flexibility is possible regarding optimum liquid-crystalline properties and preparative handling.

SUMMARY OF THE INVENTION

The invention relates to processes for the preparation of oriented, three-dimensionally crosslinked polymeric materials having a broadened cholesteric reflection band, which comprise bringing polymeric materials having cholesteric properties and an extractable material content into contact with a solvent or solvent mixture.

DESCRIPTION OF THE PREFERRED EMBODIMENTS

Figure 1:
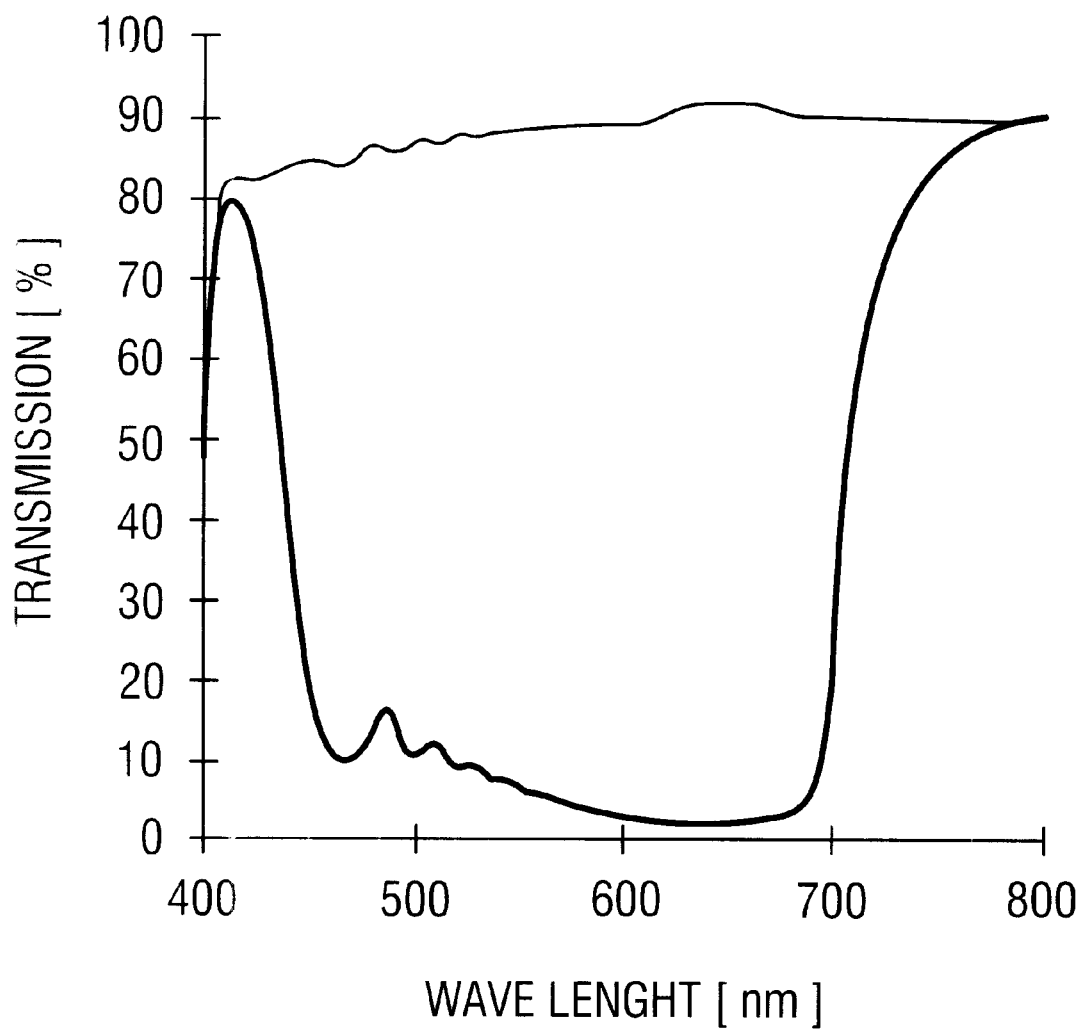
FIG. 1 shows a transmission spectrum of the film from Example 1.

The term polymeric materials having an extractable material content is preferably taken to mean three-dimensionally crosslinked polymeric materials whose network is not fully formed or whose network has an extractable content.

The term extractable material content is taken to mean any component which is present in a cholesteric network without adversely affecting the structure and which is not itself linked to the cholesteric network, and can be redissolved out of this network.

The contact with the solvent or solvent mixture does not remove from the network components which are bonded to the cholesteric network.

The contact with the solvent is preferably effected by dipping, coating or spraying.

The volume ratio between the solvent and the polymeric material film is preferably greater than 0.1.

The novel treatment of the polymeric material with solvent is preferably carried out at temperatures of between about −30° C. and about 150° C., particularly preferably at room temperature.

Polymeric materials having cholesteric properties which can be employed in the novel process can be obtained, for example, by prematurely terminating the crosslinking reaction of the starting components so that some of the components which are crosslinkable per se remain uncrosslinked.

In the case of a photochemically crosslinkable monomer or polymer, this can be achieved by shortening the UV exposure time.

A second way of preparing polymers which can be employed in the novel process is to use such a low photo-initiator content in the mixture of the starting components for the preparation of the polymers that, in spite of intensive irradiation, only part of the crosslinking reaction can take place.

A third way of preparing polymers which can be employed in the novel process comprises adding an uncrosslinkable polymer or oligomer which is compatible with the cholesteric phase to the mixture of the starting components for the preparation of the polymers.

A fourth way of preparing polymers which can be employed in the novel process is to use starting materials having very low concentrations of crosslinkable groups.

This non-exhaustive list shows by way of example how a certain content of extractable material is obtained in the polymer.

The preparation of partially crosslinked networks of this type is not restricted to photopolymerizable systems. For example, monomers, oligomers and polymers which can be converted into partially crosslinked polymers by thermally activatable free-radical formers are just as suitable as monomers, oligomers and polymers which give partially crosslinked polymers by polyaddition or polycondensation.

These partially crosslinked polymeric materials having cholesteric properties can be prepared from any desired materials which are suitable for the preparation of polymeric materials having cholesteric properties. Such materials are disclosed, for example, in EP-358208 (corresponding to U.S. Pat. No. 5,211,877) or EP-66137 (corresponding to U.S. Pat. No. 4,388,453), it being necessary to terminate the crosslinking reaction for the preparation of the polymeric material before full crosslinking has taken place. For the materials in the references cited by way of example, the relatively weak crosslinking is preferably achieved by means of very short UV exposure or by reducing the number of crosslinkable groups or by means of very low concentrations of the photoinitiator.

Examples of extractable polymerizable groups are also described in U.S. Pat. No. 4,637,896 and U.S. Pat. No. 660,038.

The partially crosslinked cholesteric polymer used in the novel process is preferably a polymer having an extractable content of up to about 90%.

The partially crosslinked cholesteric polymer is preferably employed in the form of layers, particularly preferably in the form of films. The layers preferably have a thickness of from about 5 to about 200 µm, particularly preferably from about 15 to about 80 µm.

The extraction is preferably carried out with solvents or mixtures of various solvents in which the solubility parameter is identical or similar to the solubility parameter of the polymer to be extracted or its soluble contents. These solvents are also referred to below as extractants.

For the purposes of the present invention, the term solvents having similar solubility parameters is taken to mean solvents whose solubility parameter differs by not more than about 5 units from the solubility parameter of the polymer to be extracted or its soluble contents. Information on solubility parameters is given, for example, in Polymer Handbook, J. Brandrup, E. H. Immergut, J. Wiley & Sons, 1975, chapter IV, pp. 337–353. A process for determining same is also described therein.

The smaller the difference between the solubility parameter of the extractant used and the solubility parameter of the polymer, for example of a liquid-crystalline polysiloxane, or the soluble contents thereof in the network, the more intensive the diffusion and extraction process.

It has been found that extractants whose solubility parameter differs by less than 2–3 units from the value of the polymer to be extracted are particularly effective. The partially crosslinked polymeric materials can also be treated with a mixture of 2 or more solvents, of which at least one solvent whose solubility parameter differs by not more than 5 units from the solubility parameter of the polymer to be extracted, or its soluble contents, is present in the solvent mixture in an amount of greater than 0.01% by volume. The extent and kinetics of the extraction can be modified by combining various solvents.

For example, it has been found that in the case of polysiloxanes having a solubility parameter of about 19 $(J/m^3)^{1/2}$, as employed in the examples, solvents whose solubility parameter is 17–21 $(J/m^3)^{1/2}$ produce high extractions. In the case of these solvents, excessively fast extraction can be slowed down by means of a second, less active solvent. Examples of these are glycols (for example diethylene glycol) and short-chain alcohols (for example hexanol). In the case of extractants having solubility parameter values of <17 or >21, the extraction increasingly slows in the case of the polymers used in the examples. The broadening of the reflection band is less, for the same contact time of the extractant, than for extractants having solubility parameters of >17 and <21.

In the novel process, the extraction is preferably carried out in such a way that the gradient is formed in the density of the network perpendicular to the surface of the polymer.

In one variant of the novel process, the partially crosslinked polymeric material is in the oriented and partially crosslinked state on the solvent-impermeable support material and is introduced into the extractant in this form. Diffusion of the extractant into the material and extraction of the uncrosslinked contents therefore only takes place from one surface of the film.

In another variant of the novel process, a support-free polymer film or a polymer film on a support which is permeable to the extractant used is introduced into the extractant. This allows the extractant to penetrate into the polymer film from both sides, allowing extraction from both sides of the film, resulting in network density gradients on both sides of the polymer film.

In order to achieve a maximum network density gradient, the immersion time in the extractant is limited so that the film side facing the layer support remains essentially unextracted and the side of the film facing the extractant is extracted to the maximum.

By varying the immersion time and/or the extractant, different network density gradients can be produced in the polymeric material.

The extractant still present on the polymer film after the immersion bath is preferably subsequently removed from the polymer.

This is carried out, for example, by means of a material which resorbs the extractant or by immersing the polymer into, or spraying it with, a liquid which is miscible with the extractant, and then drying the polymer.

The solubility parameter of the liquid for removing the extractant should preferably differ from the solubility parameter of the polymer by at least one unit more than the solubility parameter of the extractant used.

The extractant removal process step may also be carried out as a multistep procedure. In this case, for each further process step a liquid is selected whose solubility parameter in each case differs still further from the solubility parameter of the extractant.

It is also possible to directly dry the polymer film still containing the extractant. This is preferably carried out at about 10° C.–140° C. and a pressure of about 0.1–1200 mbar.

After the extractant has been removed and traces thereof dried off, a network density gradient exists in the film. The band width of the electromagnetic spectrum produced by light hitting a film obtained in accordance with the invention is modified in such a way that the long-wave band edge of the reflected light approximately coincides with the original reflection band, while the position of the short-wave band edge of the reflected light is determined by the extracted content of the polymer. It is thus determined by the type of extractant and also by the immersion time.

It must be ensured, by carrying out the process in a suitable way, that the extraction process does not take place to the same extent over the entire thickness of the polymeric material.

The extractant preferably should not penetrate right through the polymeric material.

Polymerizable residues still present in the polymeric material after the extraction are preferably post-crosslinked. This post-crosslinking is carried out, for example, by means of actinic light. However, it is also possible to carry out the post-crosslinking by other known crosslinking processes, for example with the aid of a thermally activatable free-radical former.

After the novel treatment, which generates a network density gradient, a broadening in the cholesteric reflection band of the polymeric material is evident.

The invention also relates to polymeric materials having cholesteric properties wherein the polymeric material has a density gradient in its polymeric network which causes the polymeric material to have a cholesteric reflection band with a width of at least 100 nm.

The novel polymeric material is preferably in the form of films. These films are produced analogously to known cholesteric films, with the difference that the cholesteric materials are not fully polymerized, but instead are only partially crosslinked and are subsequently brought into contact with a solvent. The production of cholesteric films is disclosed, for example, in U.S. Pat. No. 5,211,877.

The invention thus also relates to cholesteric films comprising polymeric materials having cholesteric properties, wherein the polymeric material has a network density gradient which causes the polymeric material to have a cholesteric reflection band with a width of at least 100 nm.

These novel cholesteric films preferably have a reflection band with a width of from about 100 nm to about 300 nm in the spectral region from about 400 to about 700 nm or a reflection band with a width of from about 50 nm to about 250 nm in the spectral region from about 200 to about 450 nm or a reflection band with a width of from about 100 nm to about 500 nm in the spectral region from about 500 to about 3000 nm.

The cholesteric films of the present invention are particularly suitable as broad-band filters, polarizers and reflectors.

The invention thus also relates to broad-band filters, polarizers and reflectors consisting of novel cholesteric materials, preferably in the form of films.

Examples of applications are cholesteric reflectors for increasing the light yield in the illumination of LC displays, polarizers in projection displays, structured multicolored filters for displays, security marks in security printing both within and outside the visible spectral region, and filters and reflectors for infra-red radiation.

The novel filters, polarizers and reflectors can be structured and/or multicolored. They consist of cholesteric films in which, during the partial crosslinking, regions having different mean wavelengths of the reflection band are generated in the film surface using photomasks and different temperatures. The colored segments can be subjected to the band broadening process steps either individually, in groups or all together.

The invention furthermore relates to optical elements consisting of structured multicolored filters, reflectors or polarizers and retardation elements for the light that corresponds to the selected wavelength ranges of the multicolored structures.

These optical elements preferably consist of novel cholesteric films and an optical retardation element having a retardation of about 50–5000 nm for light having a wavelength of about 500 nm. The retardation element can simultaneously serve as support material.

The optical retardation element preferably provides a retardation by a quarter wavelength unit of the selected reflected light which corresponds to part of the spectral region of the cholesteric reflection band of the polymer.

Particular preference is given here to optical retardation elements having a quarter wavelength unit, based on the entire spectral region which corresponds to the cholesteric reflection band of the polymer. In addition, the optical elements can also have an antireflection coating.

The examples below serve to illustrate the invention in greater detail.

Example 1 Production of film 1

The substance Wacker LC Silicone CC3767 (obtainable from Wacker-Chemie GmbH, 81737 Munich) is a cholesteric liquid-crystalline organosiloxane. The substance is mixed with 2% by weight of the photoinitiator Irgacure 907 (Ciba-Geigy) and then applied at 90° C. to a glass plate having a rubbed polyimide coating (Merck Liquicoat (R) P1-Kit ZLI 2650).

After the glass plate has been covered with a second glass plate, likewise with a polyimide coating, the two glass plates are moved relative to one another in order to distribute the melt film. A spacer having a thickness of 36 $\mu$m is located between the two glass plates, so that a corresponding film thickness of the organosiloxane/photoinitiator film is produced. The film is irradiated with UV light (40 mW/cm$^2$ in the UVA region) for 2 seconds at 80° C. One glass plate is removed. The glass plate with adhering film is measured as described below. In transmission, it has a band at 651 nm with a width of 57 nm in the plateau. The reflected light has left-handed helical polarization.

The film is immersed on the glass plate into a mixture of 10 parts by volume of 1-hexanol (solubility parameter 21.9, according to Polymer Handbook) and 9 parts by volume of furan (solubility parameter 19.2), removed after 10 seconds and immersed and agitated in a pure hexanol bath for 2 seconds, and the residual solvent is evaporated at 90° C. on a hot plate for 2 minutes.

The film was measured in transmission. The measurement was carried out in a spectrophotometer (Perkin Elmer Lambda 19 or Instrument Systems Spectro 320) using circular-polarized light generated by means of a linear polarizer and a quarter-wave Fresnel rhombus both made of calcite. The measurement shows the transmitted proportion of the light for the two circular polarizers. The result is shown in FIG. 1. The characteristic width of the cholesteric reflection band is broadened from an original 57 nm to 250 nm. The film selects the two circular polarizations over the entire band region of the broadened reflection band from 650 to 400 nm.

Example 2 Production of film 2

The two compounds A and B (A: obtained by hydrosilylation of tetramethyldisiloxane using 50 mol % of 4-allyloxybenzoyl-4-hydroxyphenyl methacrylate and 50 mol % of cholesteryl 4-allyloxybenzoate; B: obtained by hydrosilylation of tetramethyldisiloxane using 50 mol % of 4-allyloxybenzoyl-4-hydroxyphenyl methacrylate and 50 mol % of dihydrocholesteryl 4-allyloxybenzoate) are mixed in the ratio 19:81% by weight (A:B). 2 parts by weight of the photoinitiator Irgacure 907 (Ciba-Geigy) are added to these 100 parts by weight.

The substance mixture is applied at 90° C. to a glass plate with rubbed polyimide coating (Merck Liquicoat (R) PI-Kit ZLI 2650). After the glass plate has been covered with a second glass plate, likewise with a polyimide coating, the two glass plates are moved relative to one another in order to distribute the melt film. A spacer having a thickness of 36 $\mu$m is located between the two glass plates, so that a corresponding film thickness is produced. The film is irradiated with UV light (40 mW/cm$^2$ in the UVA region) for 2 seconds at 85° C. One glass plate is removed. The glass plate with adhering film is measured as described in Example 1 using a reflection attachment with 6°/6° geometry. In reflection, it has a band at 663 nm with a width of 34 nm in the plateau. The reflected light has left-handed helical polarization.

The film is immersed in a mixture of 10 parts by volume of 1-hexanol (solubility parameter 21.9) and 7 parts by volume of xylene (solubility parameter 18.0) and removed after 5 seconds, and the residual solvent is evaporated on a hot plate at 90° C. for 2 minutes. The film is measured in reflection as described in Example 1. The measurement is carried out using circular-polarized light produced as described in Example 1.

Figure 2:
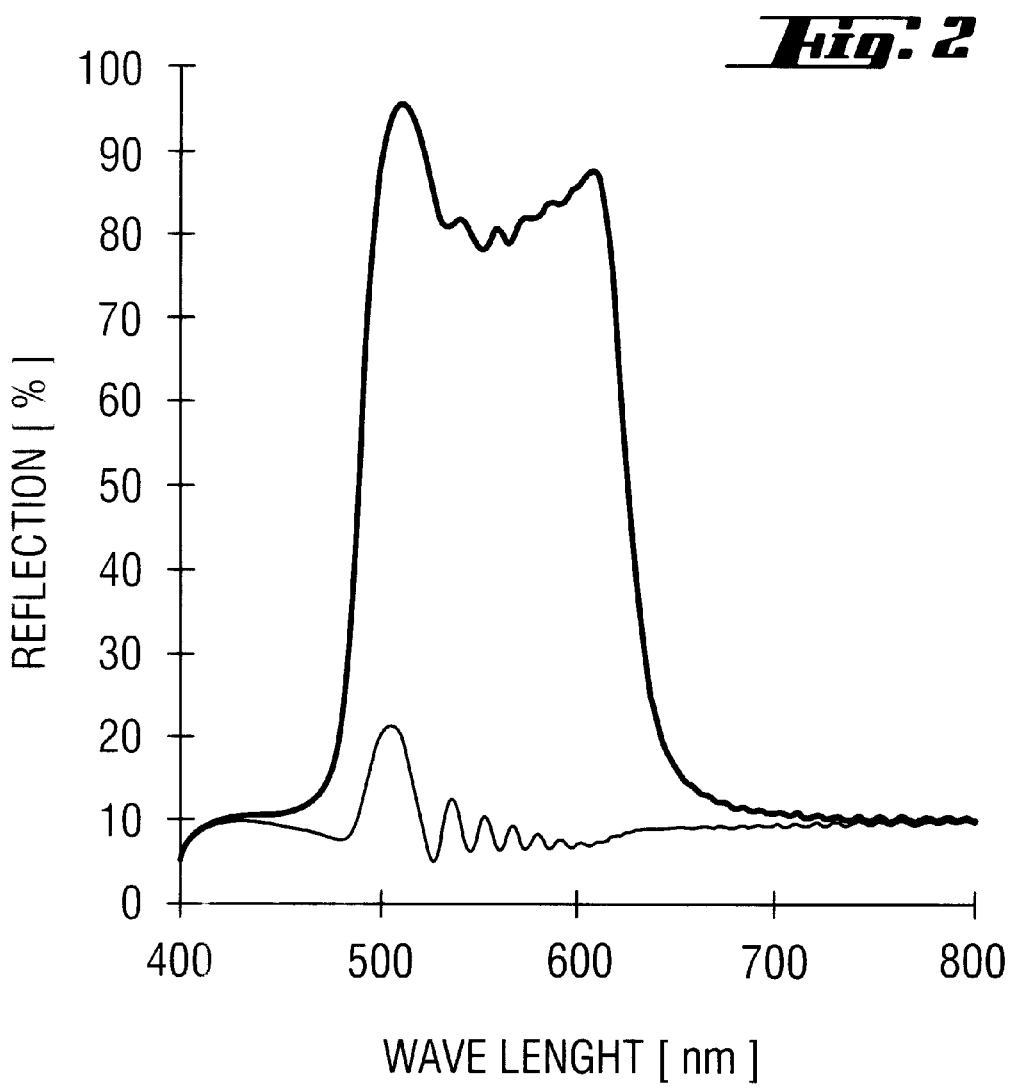
FIG. 2 shows a reflection spectrum of the film from Example 2.

FIG. 2 shows a reflection spectrum of this film. The characteristic width of the cholesteric reflection band has been broadened from an original 34 nm to 125 nm. In reflection, the film selects the two circular polarizations over the wavelength range 625–500 nm.

What is claimed is:

1. A process for the preparation of oriented, three-dimensionally crosslinked polymeric materials having a broadened cholesteric reflection band relative to the same polymeric material not brought into contact with a solvent or a solvent mixture, the process comprising extracting partially crosslinked cholesteric polymer by bringing polymeric materials having cholesteric properties and an extractable material content into contact with a solvent or solvent mixture.

2. A process as claimed in claim 1, wherein the polymeric material having cholesteric properties and an extractable material content is a partially crosslinked cholesteric polymer having an extractable content of up to about 90%.

3. A process as claimed in claim 1 wherein the solvent has a solubility parameter whose value corresponds to that of the polymer or differs therefrom by not more than 5 units.

4. A process as claimed in claim 1 wherein double bonds remaining in the polymer film after the solvent treatment are post-crosslinked.

5. A polymeric material having cholesteric properties which has a density gradient in its polymeric network which causes the polymeric material to have a cholesteric reflection band with a width of at least about 100 nm, the density gradient in the polymeric material being formed as a result of extracting partially crosslinked cholesteric polymer by bringing polymeric materials having cholesteric properties and an extractable material content into contact with a solvent or solvent mixture.

6. A cholesteric film which consists of polymeric material as claimed in claim 5.

7. A cholesteric film as claimed in claim 6, wherein the reflection band is in the spectral region from about 200 to about 3000 nm, with a band width of up to about 2800 nm.

8. A cholesteric film as claimed in claim 6, wherein the reflection band of the polymeric material is different in sub-regions of the film.

9. A broad-band filter, polarizer or reflector comprising cholesteric material as claimed in claim 5.

* * * * *